United States Patent
Das et al.

(10) Patent No.: US 8,286,131 B2
(45) Date of Patent: Oct. 9, 2012

(54) ENVIRONMENT DEFINITION FILES FOR AN ENVIRONMENT DEFINITION SYSTEM

(75) Inventors: Sreeji Das, Foster City, CA (US); Jan Franczak, Wokingham (GB); Clark Elms, Seattle, WA (US); Henriette Fux, Palo Alto, CA (US); Adrienne Wong, Den Haag (NL); Haritha Nekkalapudi, Andra Pradesh (IN); Chandra Sekhar Komali, Andra Pradesh (IN)

(73) Assignee: Oracle International Corporation, Redwood Shores, CA (US)

( * ) Notice: Subject to any disclaimer, the term of this patent is extended or adjusted under 35 U.S.C. 154(b) by 1234 days.

(21) Appl. No.: 12/053,881

(22) Filed: Mar. 24, 2008

(65) Prior Publication Data
US 2009/0240724 A1 Sep. 24, 2009

(51) Int. Cl.
*G06F 9/44* (2006.01)
(52) U.S. Cl. .......................... 717/109; 717/105
(58) Field of Classification Search .......... 717/109, 717/105
See application file for complete search history.

(56) References Cited

U.S. PATENT DOCUMENTS

| | | | | |
|---|---|---|---|---|
| 6,230,309 | B1 * | 5/2001 | Turner et al. | 717/107 |
| 7,159,106 | B2 * | 1/2007 | Meaney et al. | 713/2 |
| 7,174,538 | B2 * | 2/2007 | Asco et al. | 717/116 |
| 7,237,023 | B2 * | 6/2007 | Menard et al. | 709/224 |
| 7,448,024 | B2 * | 11/2008 | Breeden et al. | 717/125 |
| 7,636,912 | B2 * | 12/2009 | Saad et al. | 717/109 |
| 7,792,981 | B2 * | 9/2010 | Taylor | 709/230 |
| 8,037,453 | B1 * | 10/2011 | Zawadzki | 717/123 |
| 8,074,199 | B2 * | 12/2011 | Millett et al. | 717/100 |
| 2006/0230387 | A1 * | 10/2006 | Prakriya et al. | 717/127 |
| 2008/0010631 | A1 * | 1/2008 | Harvey et al. | 717/131 |

* cited by examiner

*Primary Examiner* — Li B Zhen
*Assistant Examiner* — Ryan Coyer
(74) *Attorney, Agent, or Firm* — Kilpatrick Townsend & Stockton LLP

(57) ABSTRACT

An Environment Management System (EMS) provides on-demand instances of environments for testing hardware and/or software configurations. In various embodiments, the EMS includes a processing engine that handles parsing and execution of commands in a definition file that express the lifecycle of a testing environment. Accordingly, the EMS provides flexibility to end users in the way that environments are configured and deployed. An environment definition file is provided that may contain a standard set of scripts for implementing the lifecycle of the environment, along with any custom logic specific to a user or customer.

18 Claims, 9 Drawing Sheets

```xml
<environment>
  + <!--    -->
  + <!--    -->
  - <services no_of_ports="50" unique_ports="1">
    + <!--    -->
    - <service id="database_db" name="database Database" clonable="no">
      - <tasks>
        - <task name="STARTUP">
          - <command usertype="database" description="Starting database Database Service" timeout="3000">
            - <![CDATA[
                echo "database_db start"
              ]]>
          </command>
        </task>
        - <task name="SHUTDOWN">
          - <command usertype="database" description="Shutting Down database Database Service" timeout="3000">
            - <![CDATA[
                echo "database_db stop"
              ]]>
          </command>
        </task>
      </tasks>
    </service>
    + <service id="database_listener" name="database Database Listener" clonable="no">
    + <!--    -->
    - <order>
      + <!--    -->
      - <task name="STARTUP">
          <service id="database_db" order="0" />
          <service id="database_listener" order="1" />
      </task>
      + <!--    -->
      + <task name="SHUTDOWN">
    </order>
  </services>
  - <tasks>
    - <task name="CLONE">
      - <command usertype="database" description="Creating Database Tier Environment" timeout="90">
        - <![CDATA[
              touch $EMS_CONFIG_HOME/clone.env; \
              chmod 0776 $EMS_CONFIG_HOME/clone.env; \
              cat << EOF > $EMS_CONFIG_HOME/clone.env
              export db_context=$database_SID\_$HOST_NAME
              export db_oh=$HOME/db/tech_st/10.2.0
              export db_data=$HOME/db/apps_st/data
              export db_clone_stage=$HOME/db/tech_st/10.2.0/appsutil/clone
              EOF
          ]]>
      </command>
      <!-- Configure the Database Tier   -->
      + <command usertype="database" description="Configuring Database Tier" timeout="3600">
      <!-- Configure the Applications Tier   -->
      - <command usertype="appmgr" description="Configuring Applications Tier" timeout="3600">
        - <![CDATA[
              source $EMS_CONFIG_HOME/clone.env; \
              cd $apps_clone_stage/bin; \
              ./adcfgclone.pl appsTier $apps_appltop/admin/$apps_context.xml
          ]]>
      </command>
    </task>
    + <task name="POST_CLONE">
    + <task name="PRE_DELETE">
    + <task name="PRE_TEMPLATIZE">
    + <task name="POST_TEMPLATIZE">
  </tasks>
</environment>
```

FIG. 7

ENVIRONMENT DEFINITION FILES FOR AN ENVIRONMENT DEFINITION SYSTEM

BACKGROUND OF THE INVENTION

The present invention relates to Software Configuration Management (SCM). More specifically, the present invention relates to environment definition files for an environment definition system.

In general, SCM is set of activities designed to control change by identifying work products that are likely to change, establishing relationships among them, defining mechanisms for managing different versions of these work products, controlling the changes imposed, and auditing and reporting on the changes made. SCM provides a methodology to control and manage a software development project.

One goal of SCM is environment management. Environment management involves the managing of an environment that hosts a development project. Environments can be configured and dedicated for testing a single software project. The environment may include any resources, such as software and hardware, which are required by the project. The lifecycle management of an environment requires knowledge of the process and procedures to be carried out in order to correctly perform the configuration, management, and deletion steps of every piece of software and/or hardware associated with the project (and the environment in which testing is sought). Additionally, knowledge may be required of monitoring systems in order to register and deregister the details of environment services.

Often, this process involves a knowledge transfer from the software developer to an administrator of an environment management system. Typically, information about an environment that is needed is taken from technical documentation. However, important features or concepts may be lost in the knowledge transfer. Additionally, this information is often hard coded into an environment management system. Thus, the process is often tedious and inflexible because the end user or developer can no longer readily change the environment configuration.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

The present invention relates to Software Configuration Management (SCM). More specifically, the present invention relates to environment definition files for an environment definition system.

In various embodiments, an Environment Management System (EMS) includes a processing engine that handles parsing and execution of commands defined in an environment definition file. This mechanism allows flexibility in the way that environments used to test hardware and/or software configurations can be configured. In some embodiments, the environment definition file may contain a standard set of scripts for implementing the lifecycle of the environment, along with any custom logic specific to a user or customer.

For managing environments associated with software projects, an interface can be provide that enables a user to declaratively specify the lifecycle of an environment. The lifecycle may include provisioning and initialization of hardware and/or software resources, data copying, operating system configuration, network management, user management, or the like. An environment definition file can be generated that is indicative of the lifecycle of the environment. The environment definition file can be created and modified by the user or developer that is best positioned to administer the environment.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 7 illustrates an XML environment declaration file in one embodiment according to the present invention;

DETAILED DESCRIPTION OF THE INVENTION

In various embodiments, an Environment Management System (EMS) provides on-demand instances of environments for testing hardware and/or software configurations. The EMS is typically a key element of one or more hardware and/or software development processes. Often, the EMS provides stability to the production of a software system by controlling the product evolution, such as through identification of product components and changes, initiation, deployment, evaluation, authorization, and control of change, and by recording and reporting the history and status of the product and its changes. The EMS may also provide support functions, maintain the actual components of a product, record the history of the components as well as of the whole product, provide a stable working context for changing the product, support the manufacture of the product from its components, and coordinates concurrent changes.

In various embodiments, the EMS includes a processing engine that handles parsing and execution of commands in a definition file that express the lifecycle of a testing environment. Accordingly, the EMS provides flexibility to end users in the way that environments are configured and deployed. An environment definition file is provided that may contain a standard set of scripts for implementing the lifecycle of the environment, along with any custom logic specific to a user or customer.

Figure 1:
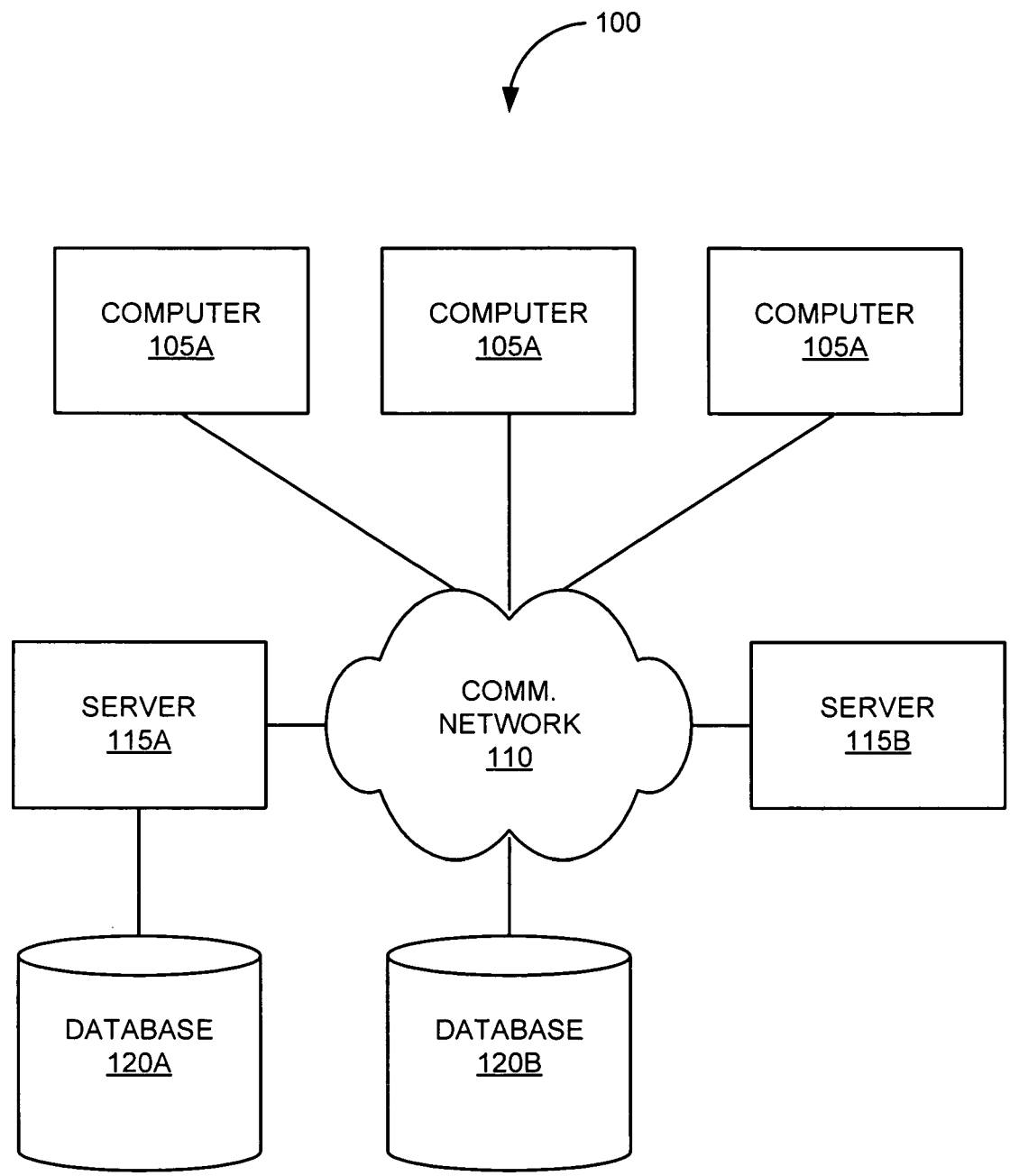
FIG. 1 is a simplified illustration of a system that may incorporate an embodiment of the present invention.

FIG. 1 is a simplified illustration of a system 100 that may incorporate an embodiment of the present invention. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more computers 105 (e.g., computers 105A, 105B, and 105C). Computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These computers 105 can also have any of a variety of applications, including one or more applications configured to perform methods of the invention, as well as one or more office applications, database client and/or server applications, and web browser applications.

Alternatively, computers 105 can be any other electronic device, such as a thin-client computer, Internet-enabled mobile telephone, and/or personal digital assistant, capable of communicating via a network (e.g., communications network 110 described below) and/or displaying and navigating web pages or other types of electronic documents. Although the exemplary system 100 is shown with three computers, any number of computers or devices can be supported.

Certain embodiments of the invention operate in a networked environment, which can include communications network 110. Communications network 110 can be any type of network familiar to those skilled in the art that can support data communications using any of a variety of commercially-available protocols, including without limitation TCP/IP, SNA, IPX, AppleTalk, and the like. Merely by way of example, communications network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115A and 115B). Each of server computers 115 may be configured with an operating system including without limitation any of those discussed above, as well as any commercially-available server operating systems. Each of server computers 115 may also be running one or more applications, which can be configured to provide services to one or more clients (e.g., computers 105) and/or other servers (e.g., server computers 115).

Merely by way of example, one of server computers 115 may be a web server, which can be used, merely by way of example, to process requests for web pages or other electronic documents from computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the computers 105 to perform methods of the invention.

Server computers 115, in some embodiments, might include one or more file and or/application servers, which can include one or more applications accessible by a client running on one or more of computers 105 and/or other server computers 115. Merely by way of example, one or more of server computers 115 can be one or more general purpose computers capable of executing programs or scripts in response to computers 105 and/or other server computers 115, including without limitation web applications (which might, in some cases, be configured to perform methods of the invention).

Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of computers 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on one of computers 105 and/or another of servers 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120A and 120B). The location of the database(s) 120 is discretionary: merely by way of example, database 120A might reside on a storage medium local to (and/or resident in) server computer 115A (and/or one or more of user computers 105). Alternatively, database 120B can be remote from any or all of user computers 105 and server computers 115, so long as it can be in communication (e.g., via communications network 110) with one or more of these. In a particular set of embodiments, databases 120 can reside in a storage-area network ("SAN") familiar to those skilled in the art. (Likewise, any necessary files for performing the functions attributed to user computers 105 and server computers 115 can be stored locally on the respective computer and/or remotely, as appropriate). In one set of embodiments, one or more of databases 120 can be a relational database, such as an Oracle™ database, that is adapted to store, update, and retrieve data in response to SQL-formatted commands. Databases 120 might be controlled and/or maintained by a database server, as described above, for example.

In various embodiments, all or part of system 100 may be configured and deployed as part of a testing environment. In various embodiments, the testing environment is first prepared as a source environment. For example, a user may manually allocate hardware resources, and install and configure all software resources associated with the environment in a desired state. Next, the source environment is templatized. Templatization is the process of creating a "frozen" image of an environment such that clones can be created out of this frozen image. Finally, the templatized environment may be published, such that users with appropriate access controls can create instances of the source environment for testing purposes.

Figure 2:
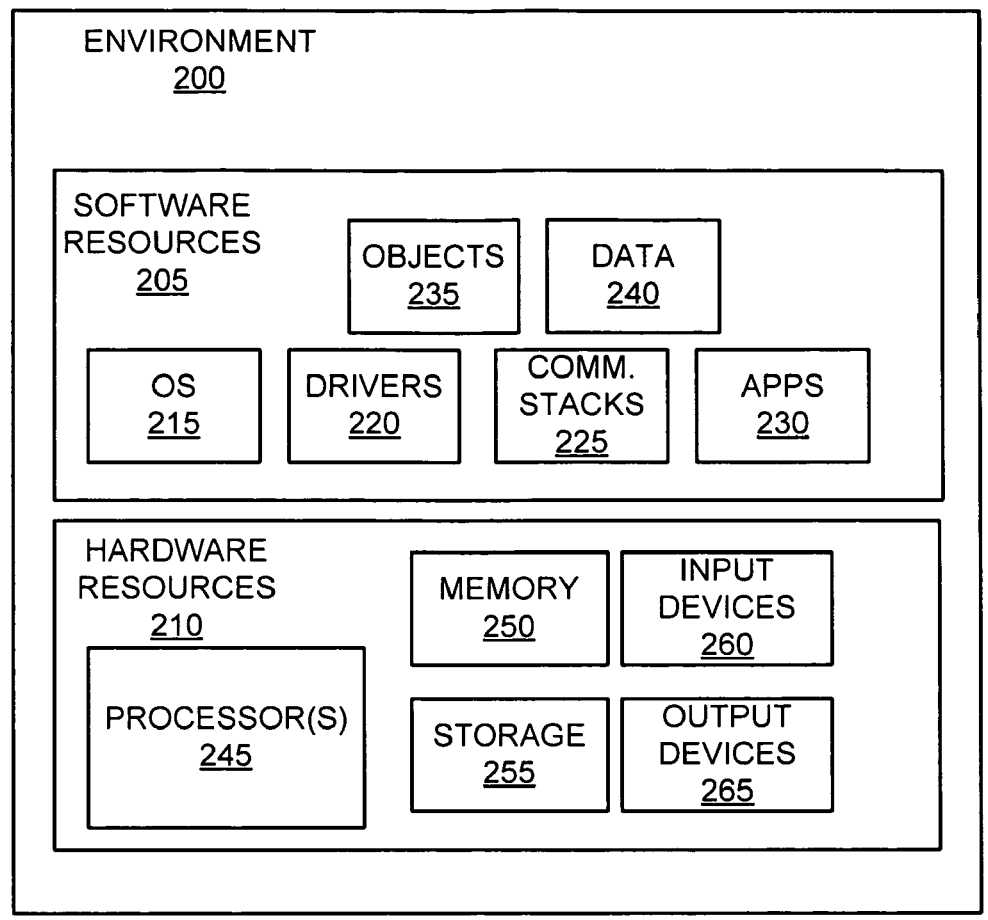
FIG. 2 is a block diagram of an environment that may be managed by an Environment Management System (EMS) in one embodiment according to the present invention.

FIG. 2 is a block diagram of environment 200 that may be managed by an EMS in one embodiment according to the present invention. In various embodiments, environment 200 includes software resources 205 and hardware resources 210 necessary for a product.

In this example, software resources 205 includes operating system 215, drivers 220, communications stacks 225, applications 230, objects 235, and data 240. Operating systems 215 can include any commercial and non-commercial software programs that manage access to hardware. Drivers 220 can include software programs, firmware, and the like, that allow other programs to utilize a hardware device. Communications stacks 225 can include software programs that provide communications with one or more networks.

Hardware resources 210 include one or more processors 245, memory 250, storage 255, input devices 260, and output devices 265. Hardware resources 210 may be physical resources, such as an actual computer, or virtual hardware resources (e.g., a virtual machine). Storage 255 may be a physical storage medium, or storage allocated from a storage area network, network attached storage, and the like. Input devices 260 include any device that provides input, such as keyboards, mice, user input devices, and the like. Output devices 265 include any device that provides output, such as displays, printers, etc.

Figure 3:
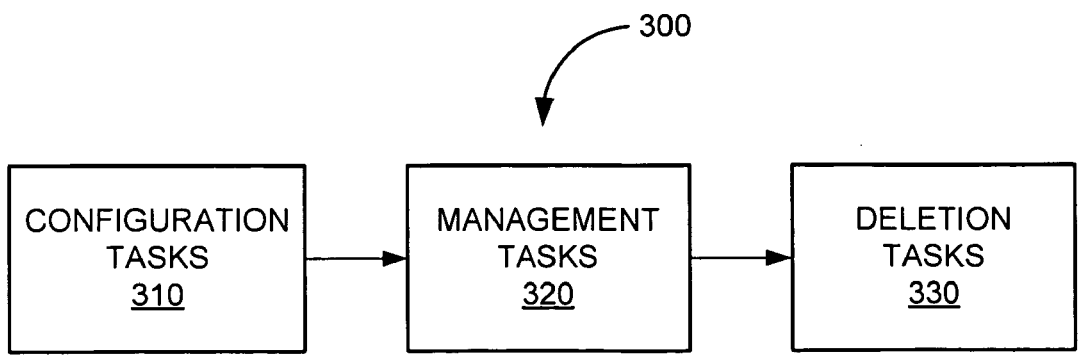
FIG. 3 is a block diagram of a simplified process illustrating environment management in one embodiment according to the present invention.

FIG. 3 is a block diagram of a simplified process illustrating environment management in one embodiment according to the present invention. In this example, one or more configuration tasks 310 may be performed to instantiate or configure an environment (e.g., environment 200). For example, a sequence of tasks or operations may be performed that assign and provision components of hardware resources 210 for environment 200. The type of architecture, the number of processors, how much memory or storage, the types of devices that are attached and activated, and the like, may be configured. In another example, one or more tasks or operations may be performed that install or otherwise load and configure software resources 205 for execution using hardware resources 210 for environment 200.

Once the environment is configured and provisioned, one or more management tasks 320 may be performed to manage the environment. For example, sample or test data may be stored in storage or memory. In another example, users and groups may be added, assigned, or deleted from operating system 215 or applications 235. The particular ports of communications stacks 225 on which network services listen may be changed. In yet another example, one or more of applications 235 may be started or stopped or tested.

To complete the lifecycle of the environment, one or more deletion tasks 330 may be performed. For example, applications may be stopped and the operating system shut down. In another example, hardware resources are de-allocated, memory and storage wiped, and the like.

Figure 4:
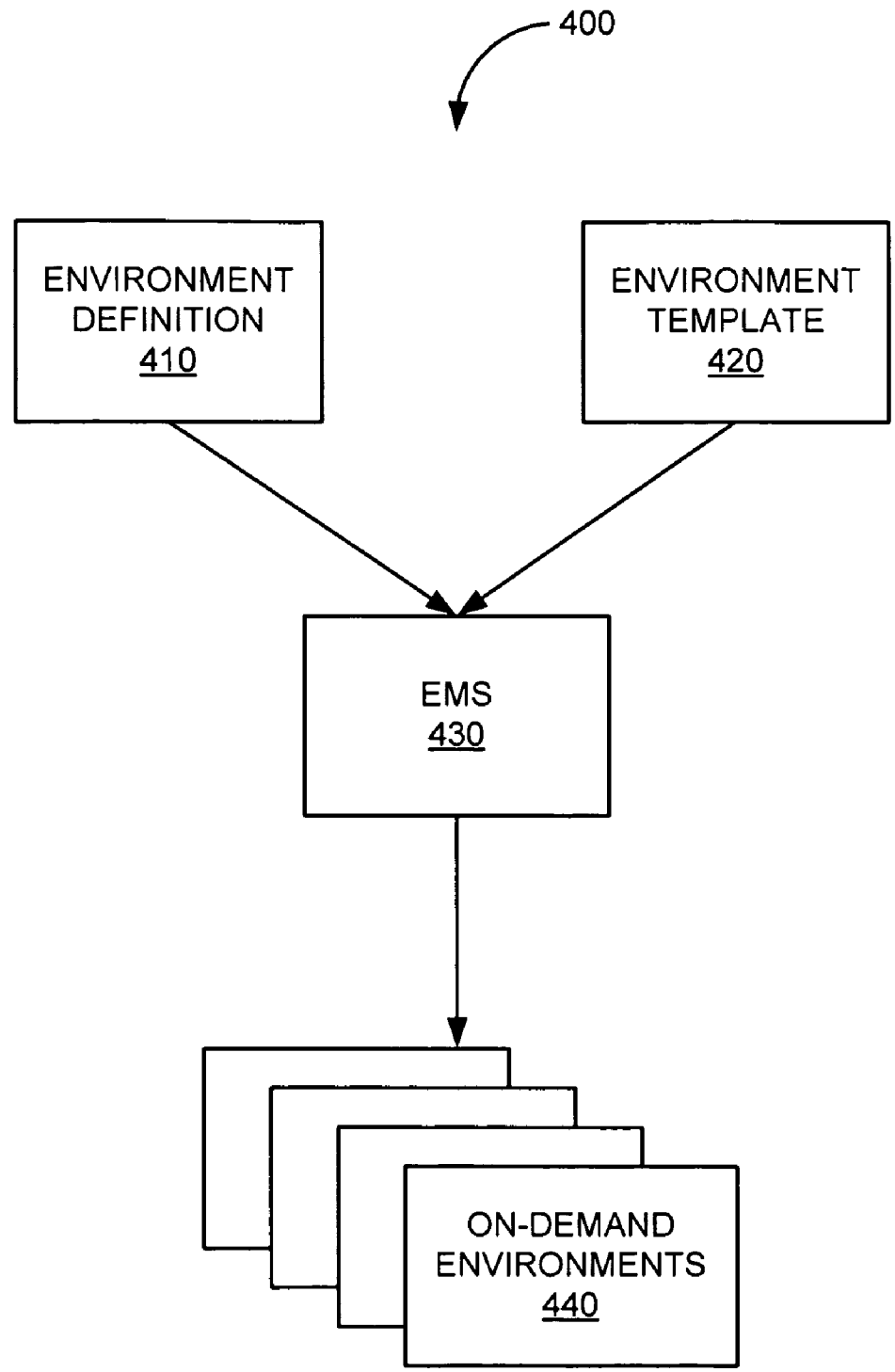
FIG. 4 is a block diagram of an environment management system in one embodiment according to the present invention.

FIG. 4 is a block diagram of environment management system 400 in one embodiment according to the present invention. In this example, environment definition 410 and environment template 420 are used by EMS 430 to generate one or more on-demand environments 440.

In various embodiments, environment definition 410 is any set of definitions, specifications, and/or data that define the lifecycle of an environment. In other words, environment definition 410 encapsulates the steps required for configuration, cloning, management, registration, and any other operation required by a user to manage an environment. Environment definition 410 may be a file in human readable form formatted according to the Extensible Markup Language (XML), or any other suitable markup or formatting language.

In one example, environment definition 410 defines the one or more configurations tasks 310 of FIG. 3, the one or more management tasks 320, and the one or more deletion tasks 330. Environment definition 410 may include commands, logic, and data that may be interpreted and/or executed by EMS 430 to configure, manage, and delete an environment.

Environment template 420 is any set of definitions, specifications, and/or data that define a template of hardware and/or software resources associated with an environment. In various embodiments, a user may create and configure one instance of an environment. For example, the user may install and configure software applications on a given set of hardware. The instance of the environment (e.g., the configured state of the software and the hardware) may then be used as a template for on-demand environments 440 whose lifecycle is managed using environment definition 410 (e.g., altering any identifiers that need to be unique, adding users, etc.).

Figure 5:
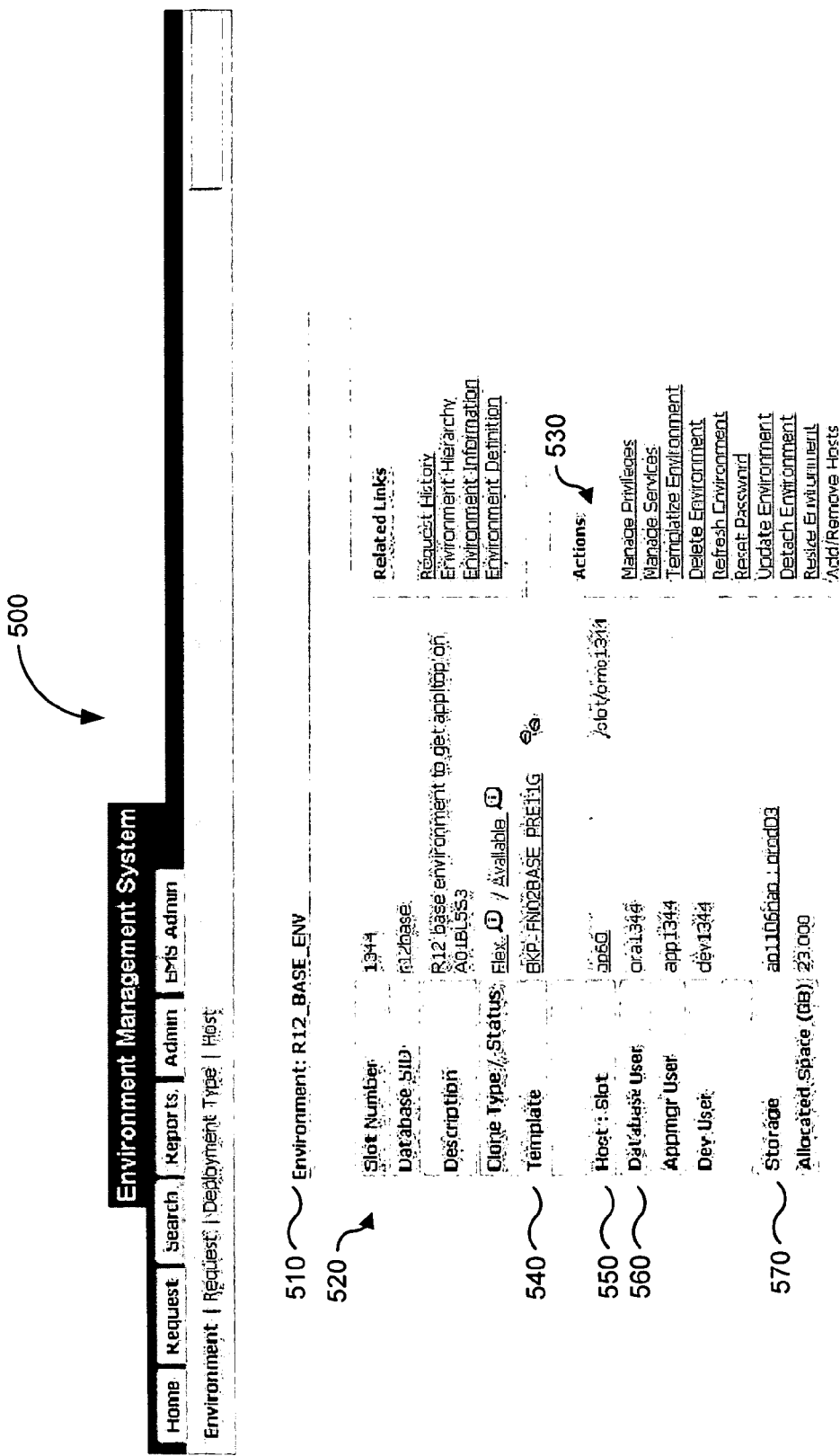
FIG. 5 is a screenshot of an interface displaying information associated with an environment specification declared by a user in one embodiment according to the present invention.

FIG. 5 is a screenshot of interface 500 displaying information associated with an environment definition declared by a user in one embodiment according to the present invention. Interface 500 includes name 510 (e.g., "R12_BASE_ENV"), status 520, and one or more actions 530.

In this example, status 520 includes information associated with the environment, such as template indicator 540, host indicator 550, user indicators 560, and storage indicator 570. In various embodiments, template indicator 540 displays information associated with the environment template associated with the environment. A user may click on or otherwise select a link associated with template indicator 540 to create or select an environment template to be associated with the environment. Host indicator 500 displays information associated with one or more hosts or devices (e.g., the hardware resources) of an environment. The hosts or devices may be physical or virtual.

User indicators 560 display information associated with users that may exists in the environment. For example, user indicators 560 may include information for operating system users, application users, development users, database users, network users, groups, and the like. A user identification number or other alphanumeric identifier may be displayed. Storage indicator 570 displays information associated with the location of data associated with the environment.

Figure 6:
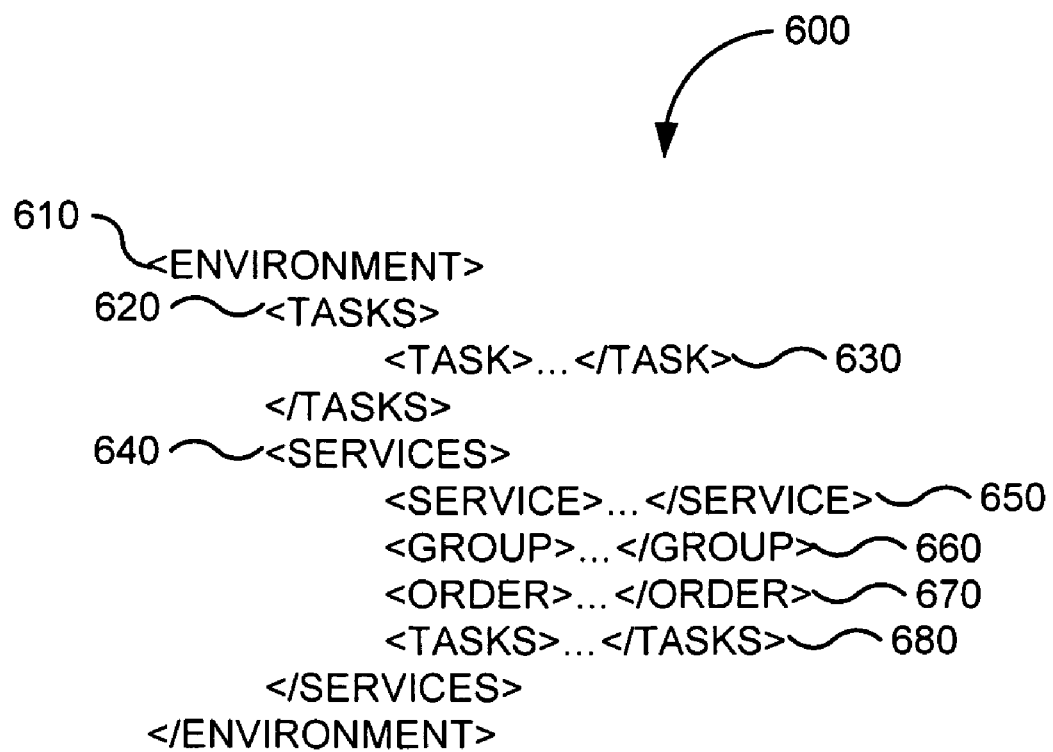
FIG. 6 illustrates an XML structure that can be used to declaratively specify an environment definition in one embodiment according to the present invention.

FIG. 6 illustrates XML structure 600 that can be used to declaratively specify an environment definition in one embodiment according to the present invention. In this example, XML structure 600 includes environment root 610, tasks section 620 that may define one or more tasks 630, and services section 640. Services section 640 includes service section 650, group section 660, order section 670, and tasks section 680.

In various embodiments, tasks section 620 relates to activities to manage the entire environment. Typically, tasks section 620 contains task elements, each with a given name. Some examples of names of tasks are as follows: CLONE, POST_CLONE, PRE_TEMPLATIZE, POST_TEMPLATIZE, PRE_DELETE, REGISTER, and DEREGISTER.

Any commands which are found in tasks section 620 will be executed in the order provided using the usertypes specified. The following is one example of a tasks section 620:

```
<task name="CLONE">
    <command usertype="dbmgr">
        $HOME/configure.sh
    </command>
    <command usertype="appmgr">
        $HOME/configure.sh
    </command>
</task>
```

In the sample XML definition above, the two scripts will be run in sequence as the users corresponding to the usertypes "dbmgr" and "appmgr." For example, the user types can be mapped by the EMS that processes the environment definition file containing the sample XML definition to UNIX or LINUX users that own those components. The scripts can be run as those userids. In various embodiments, the details of the command runs and the sequence in which they are executed will be stored when the commands succeed. This information would be used in the event that a subsequent command fails. Upon retry of the request, those commands which had already been completed will be skipped. However, if the file is modified and the contents of the command or the sequence is changed in any way then the command will run again.

Services section 640 pertains to the services that can be created as part of the environment. The definition file also provides the information needed to manage the services at differing levels of granularity. For example, tasks in tasks section 680 can manage all services, a group of services, and/or individual services.

Order section 670 provides a facility to define the proper sequencing when individual services are started and stopped. One or more task elements may also be provided here to define the order rather than any action. In various embodiments, order section 670 provides tasks named STARTUP and SHUTDOWN. The following is one example of order section 670:

```
<task name="STARTUP">
    <service id="oracle_db" order="0" />
    <service id="oracle_listener" order="1" />
    <service id="oracle_opmn" order="2" />
    <group id="apache_jserv" order="3" />
    <service id="oracle_apache" order="4" />
    <service id="oracle_jserv" order="5" />
    <service id="oracle_forms" order="6" />
    <service id="oracle_oafm" order="7" />
    <service id="oracle_fndfs" order="8" />
    <service id="oracle_icm" order="9" />
    <service id="oracle_jtf" order="10" />
</task>
```

In various embodiments, the id's map to the services and groups defined under services section 640. In the event that a service level STARTUP or SHUTDOWN command is attempted based on a provided set of services, then the order is applied. For example, should a request be placed to STARTUP the oracle_db and oracle_forms services then the order of startup will be taken from order section 670. The STARTUP task for the oracle_db service will be run and then the task for the oracle_forms service would be run.

In various embodiments, defining a task may require that information be supplied from the user, without which the commands will not be able to run. Within a task element, a user can define a userinput element. This may contain one or more parameter sections, each of which will be used to ensure that the requester provides the required information at the time of submission. It may be possible to define userinput elements at the following levels: environment/tasks/task, environment/services/tasks/task, environment/services/group/tasks/task, environment/services/service/tasks/task.

In some embodiments, a user interface or UI (e.g., interface 500 of FIG. 5) may try to fetch any userinput blocks from the environment definition file which correspond to the task it is about to perform. The delete UI, for example, may look for a userinput element in the "PRE_DELETE" task.

The following is a sample userinput block:

```
<userinput>
    <param id="bug_number"
        name="Reference Bug Number"
        optional="yes"
        type="inputbox(7)"/>
    <param id="customer_name"
        name="Reference Customer Name"
        optional="yes"
        type="inputbox(128)"/>
</userinput>
```

In some embodiments, the following attributes are applicable to a parameter element:

id—Used as the variable name. Additionally used as a unique key if userinput from multiple task elements is being collated.

name—Used to label fields when requesting input from the user.

hidden—Used to determine whether the value supplied should be masked on input and encrypted when stored.

repository—The value can be either "yes" or "no".

optional—Used to validate whether submission may proceed if no value is supplied at submission. The value can be either "yes" or "no".

type—The type attribute of a parameter element will control the painting of the UI and the format of the values passed down to the request.

inputbox(N)—Any parameters with a type of "inputbox(N)" will be represented in the EMS UI as a simple text input box. The value will be supplied will be stored and passed as an EMS request parameter.

single-select—A parameter whose type is set to "single-select" will be presented in the EMS UI as a list from which only one value may be selected.

multi-select—The multi-select type of parameter element is presented to the user in the same way as the single-select. The difference being that the user can choose more than one option. Values chosen can be stored and/or passed, e.g., as a comma separated list, as an EMS request parameter.

file—When defining a parameter whose type is "multi-select" or "single-select" it is possible to specify a file attribute. This avoids the need to store the option's in the definition file.

FIG. 7 illustrates XML environment declaration file 700 in one embodiment according to the present invention. In this example, file 700 includes an environment section 705. Environment section 705 expands into services section 710 and tasks section 715.

Services section 710 defines the number of ports (e.g., no_of_ports="50") and the number of unique ports (e.g., unique_ports="1"). Services section 710 includes one or more services, such as service 720. Service 720 defines a service named "database Database" with an identifier (ID) of "database_id." Service 720 further defines whether the service is clonable.

Service 720 includes one or more tasks (e.g., STARTUP or SHUTDOWN) in services task section 725. In one example, task 730 named "STARTUP" in services task section 725 defines one or more operations or commands in command section 735. Command section 735 specifies the user type of the command (e.g., usertype="database"), a description (e.g., "Starting Database Service"), and a timeout value. Command section 735 further includes a command data section 740 that specifies data, actions, scripts, operations, and the like to be executed for the command. In this example, command data section 740 includes the command "echo database_db start."

Services section 710 further defines the order of any tasks in order section 745. In this example, order section 745 the order of the startup tasks in order task section 750, which includes order service section 755 that provides an order of "0" (or first in line) to a service with the identifier of "database_id."

Tasks section 715 includes one or more tasks, such as PRE_CLONE, CLONE, POST_CLONE, PRE_TEMPLATIZE, POST_TEMPLATIZE, PRE_DELETE, REGISTER, and DEREGISTER. In one example, task 760 defines a CLONE task with one or more commands. Task command section 765 defines a command with user type "database," description "Creating Database Tier Environment," and a timeout value. Task command section 765 also includes a command data section 770, which specifies data, logic, commands, and operations to be executed. For example, command data section 770 may include the following shell commands:

```
touch $EMS_CONFIG_HOME/clone.env; \
chmod 0776 $EMS_CONFIG_HOME/clone.env; \
cat << EOF > $EMS_CONFIG_HOME/clone.env
    export db_context=$database_SID\_$HOST_NAME
    export db_oh=$HOME/db/tech_st/10.2.0
    export db_data=$HOME/db/apps_st/data
    export db_clone_stage=$HOME/db/tech_st/10.2.0/appsutil/clone
EOF
```

Accordingly, file 700 incorporates the knowledge of the lifecycle management processes of an environment, which can be owned by the end users and readily changed as necessary. Additionally, file 700 is broken up into different sections based on the lifecycle management process that has been captured for the environment. Thus, sections are broken down in to commands which detail the activity to be performed (e.g. run a script) and the user type which should be undertaking the activity.

Figure 8:
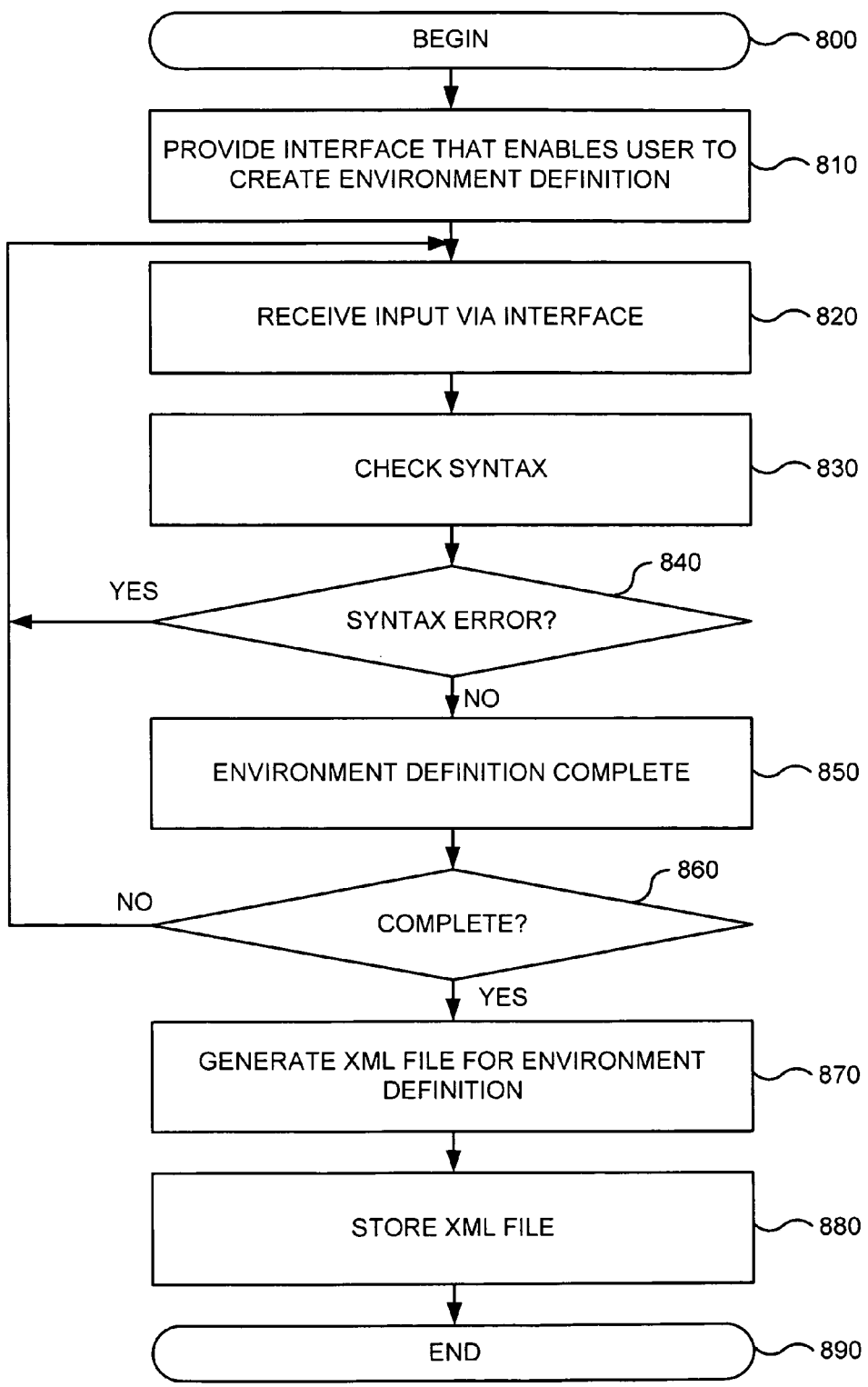
FIG. 8 is a flowchart of a method for declaratively specifying the process and procedures to perform configuration, management, and deletion of an environment in one embodiment according to the present invention.

FIG. 8 is a flowchart of a method for declaratively specifying the process and procedures to perform configuration, management, and deletion of an environment in one embodiment according to the present invention. The processing depicted in FIG. 8 may be performed by software modules (e.g., instructions or code) executed by a processor of a computer system, by hardware modules of the computer system, or combinations thereof. FIG. 8 begins in step 800.

In step 810, an interface into an EMS is provided that enables or allows a user to create an environment definition. One example of an interface is a browser executing on a client machine that connects to a server. The interface may display one or more graphical user interface (GUI) elements that prompt the user for information associated with an environment during one or more interactive sessions with the user. The interface may also include mechanisms that allow the user to upload information associated with the environment.

In step 820, input is received via the interface. For example, the user may provide information about an environment (e.g., name, hardware and/or software resource requirements, etc.) in one or more input forms associated with a GUI. In some embodiments, the EMS may check the syntax of the input provided via the interface. The EMS may validate arguments, parameters, availably of resources, and the like. If there is a syntax error determined in step 840, the EMS may prompt the user for further input to be received in step 820.

If there is no syntax error determined in step 840, a determinations is made whether the environment definition is complete in step 850. For example, the EMS may specify the minimum required information that defines an environment. The EMS may determine whether the information that has been supplied by the user satisfies the minimum requirements to define an environment. If the environment definition is determined not to be complete in step 860, the EMS may prompt the user for further input to be received in step 820.

If the environment definition is compete in step 860, an XML file for the environment definition is generated in step 870. As discussed previously, the XML file can be broken up in to different sections based on the lifecycle management process associated with the environment that has been captured from the user via the interface to the EMS. There may be sections for cloning, templatizing, and deleting the environment, as well as a section for the management of the services associated with the environment. Furthermore, the XML file can include sections that are broken down into commands which detail the activity to be performed (e.g. run a script) and the user type which should be undertaking the activity.

In step 880, the XML file is stored. The XML environment definition file may be later retrieved for subsequent modification by the user or used in deploying instances of the environment defined by the XML file. FIG. 8 ends in step 890.

Figure 9:
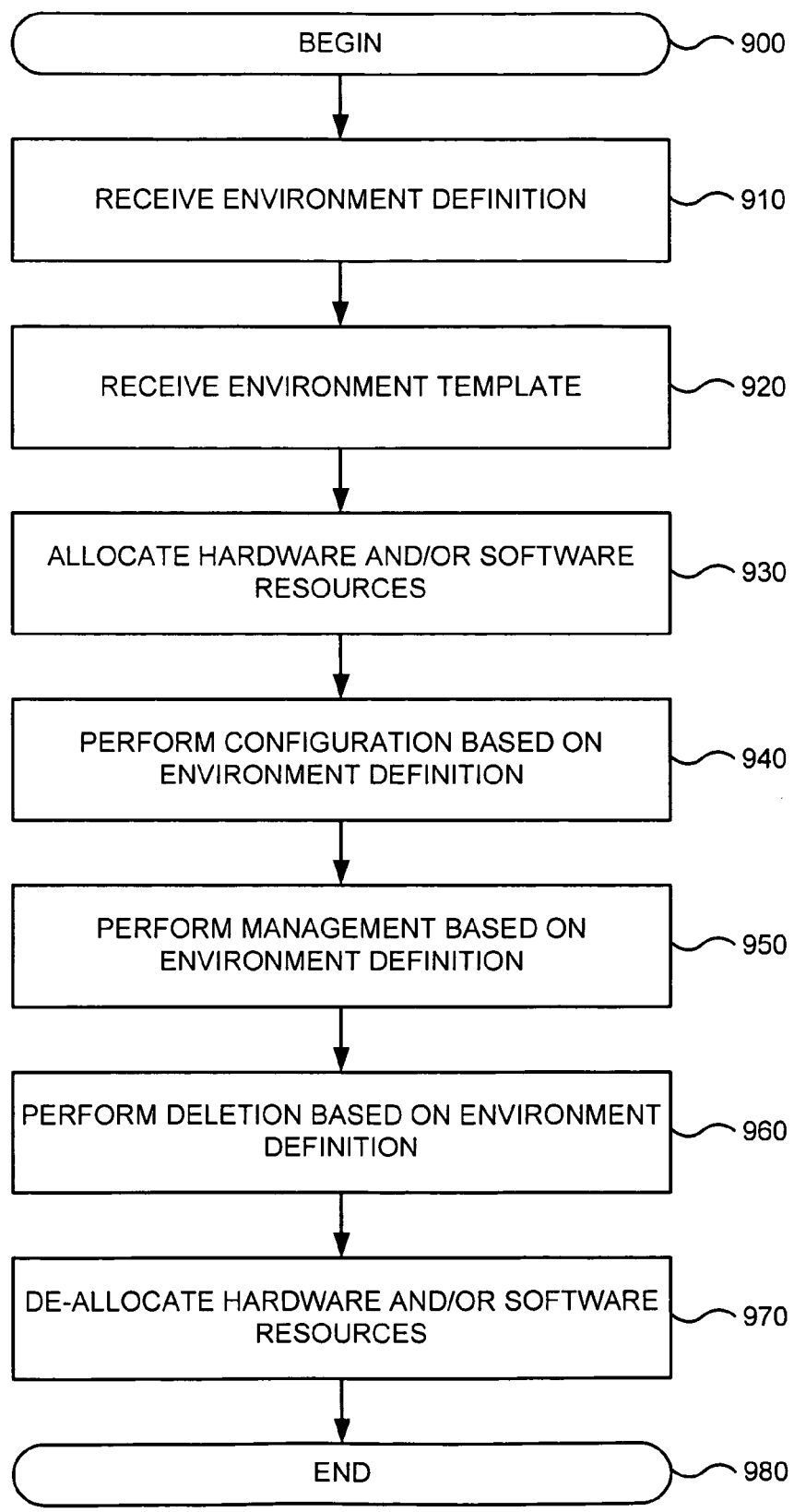
FIG. 9 is a flowchart of a method for generating a dedicated environment using an environment definition file in one embodiment according to the present invention.

FIG. 9 is a flowchart of a method for generating a dedicated environment using an environment definition file in one embodiment according to the present invention. FIG. 9 begins in step 900.

In step 910, an environment definition is received. For example, an EMS system may receive input specifying or selecting an XML environment definition file. In step 920, an environment template is received.

In step 930, hardware and/or software resources are allocated to an instance of the environment defined in the environment definition. For example, a physical computer satisfying criteria specified by the environment definition and/or the environment template may be assigned to the environment. In another example, a virtual machine is created and assigned to the environment. Processors, memory, storage, and devices may be allocated to the environment. Operating systems, applications, and other software may be installed onto the physical or virtual machine.

In step 940, configuration of the environment is performed based on the environment definition file. For example, operating system and applications users may be created, scripts may be executed using predetermined user IDs, execution environment variables may be exported, ports may be configured, various system identifiers may be updated, and the like, to configure the environment for testing.

In step 950, management of the environment is be performed based on the environment definition file. In various embodiments, one or more testing routines may be performed within the environment. Subsequent to or in-between tests, commands and/or tasks may be performed to manage the environment. For example, different users may be created for different tests, ports may be updated, and the like, to manage the environment for testing.

In step 960, deletion of the environment is performed based on the environment definition file. For example, hardware devices may be de-initialized, applications may be closed, the operating system shut down, memories and storage may be wiped, and the like to delete the environment after testing. In step 970, the hardware and/or software resources are de-allocated. FIG. 9 ends in step 980.

Figure 10:
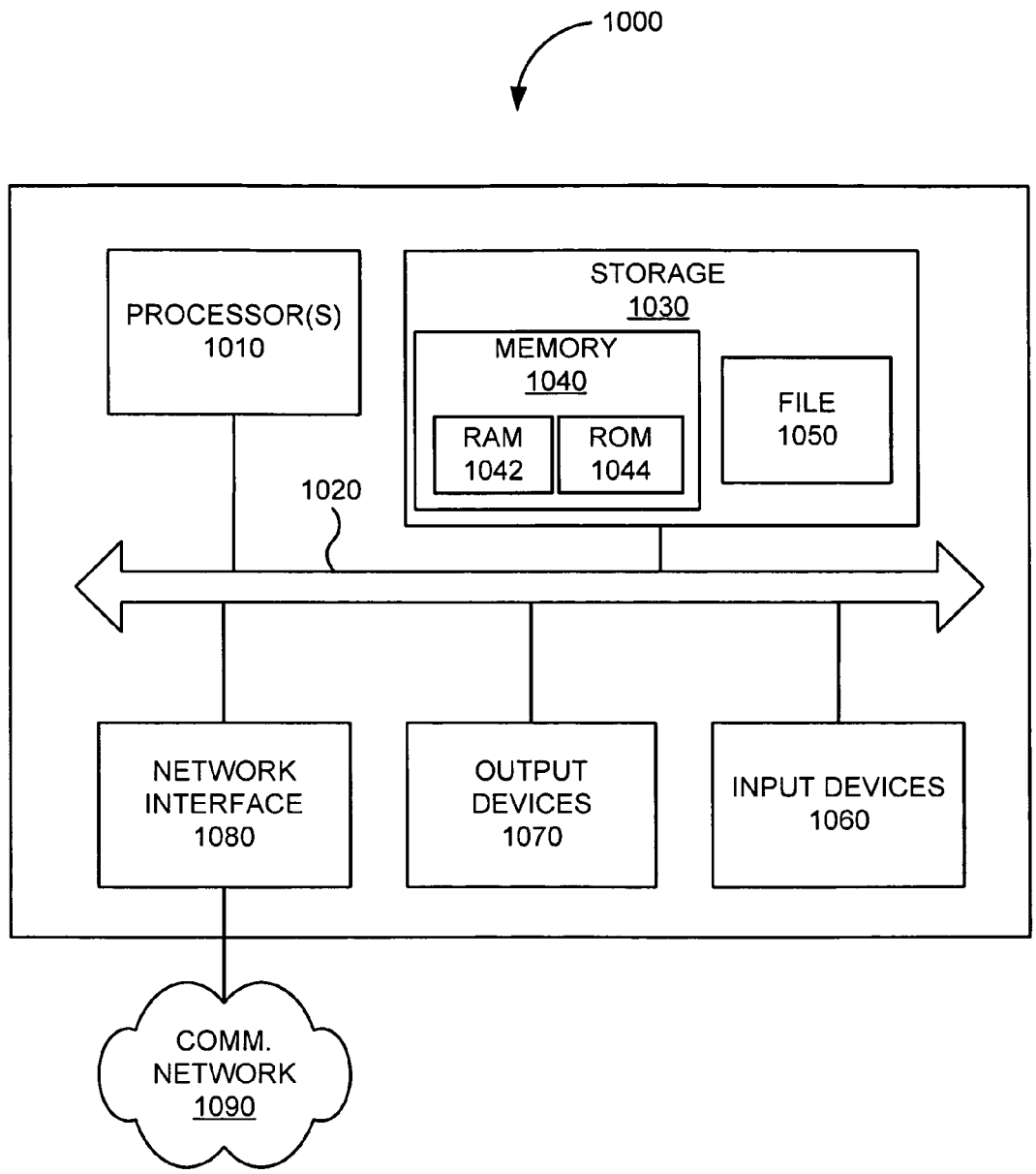
FIG. 10 is a simplified block diagram of a computer system that may be used to practice embodiments of the present invention

FIG. 10 is a simplified block diagram of computer system 1000 that may be used to practice embodiments of the present invention. As shown in FIG. 10, computer system 1000 includes processor 1010 that communicates with a number of peripheral devices via bus subsystem 1020. These peripheral devices may include storage subsystem 1030, comprising memory subsystem 1040 and file storage subsystem 1050, input devices 1060, output devices 1070, and network interface subsystem 1080.

Bus subsystem 1020 provides a mechanism for letting the various components and subsystems of computer system 1000 communicate with each other as intended. Although bus subsystem 1020 is shown schematically as a single bus, alternative embodiments of the bus subsystem may utilize multiple busses.

Storage subsystem 1030 may be configured to store the basic programming and data constructs that provide the functionality of the present invention. Software (code modules or instructions) that provides the functionality of the present invention may be stored in storage subsystem 1030. These software modules or instructions may be executed by processor(s) 1010. Storage subsystem 1030 may also provide a repository for storing data used in accordance with the present invention. Storage subsystem 1030 may comprise memory subsystem 1040 and file/disk storage subsystem 1050.

Memory subsystem 1040 may include a number of memories including a main random access memory (RAM) 1042 for storage of instructions and data during program execution and a read only memory (ROM) 1044 in which fixed instructions are stored. File storage subsystem 1050 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 1060 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In various embodiments, use of the term "input device" is intended to include all possible types of devices and mechanisms for inputting information to computer system 1000.

Output devices 1070 may include a display subsystem, a printer, a fax machine, or non-visual displays such as audio output devices, etc. The display subsystem may be a cathode ray tube (CRT), a flat-panel device such as a liquid crystal display (LCD), or a projection device. In various embodiments, use of the term "output device" is intended to include all possible types of devices and mechanisms for outputting information from computer system 1000.

Network interface subsystem 1080 provides an interface to other computer systems, devices, and networks, such as communications network 1090. Network interface subsystem 1080 serves as an interface for receiving data from and transmitting data to other systems from computer system 1000. Some examples of communications network 1090 are private networks, public networks, leased lines, the Internet, Ethernet networks, token ring networks, fiber optic networks, and the like.

Computer system 1000 can be of various types including a personal computer, a portable computer, a workstation, a network computer, a mainframe, a kiosk, or any other data processing system. Due to the ever-changing nature of computers and networks, the description of computer system 1000 depicted in FIG. 10 is intended only as a specific example for purposes of illustrating the preferred embodiment of the computer system. Many other configurations having more or fewer components than the system depicted in FIG. 10 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for managing environments associated with software projects, the method comprising:

generating, with one or more processors associated with one or more computer systems, information configured to provide a graphical user interface that enables a user of the graphical user interface to declaratively specify the lifecycle of one or more environments to be created by an environment management system for executing software code;

receiving, at the one or more computer systems, input provided via the graphical interface indicative of at least one task to be executed by an environment management system to create the one or more environments, at least one task to be executed by the environment management system to manage the execution of software code in the one or more environments, and at least one task to be executed by the environment management system to destroy the one or more environment; and generating, with one or more processors associated with the one or more computer systems, a definition file indicative of the lifecycle of the one or more environments based on the input provided via the graphical interface that instructs the environment management system to deploy one or more environment templates as the one or more environments created by the environment management system for executing software code.

2. The method of claim 1 wherein receiving the input provided via the graphical interface comprises receiving information defining one or more tasks to be performed at a predetermined stage of the lifecycle of the environment for a service within the one or more environments.

3. The method of claim 1 wherein receiving the input provided via the graphical interface comprises receiving information indicative of an ordering associated with one or more tasks.

4. The method of claim 1 wherein receiving the input provided via the graphical interface comprises receiving information indicative of a user that will execute a task.

5. The method of claim 1 wherein the environment definition comprises an Extensible Markup Language (XML) file.

6. The method of claim 1 further comprising:
receiving, at the one or more computer system, the one or more environment templates, each environment template including at least an operating system and one or more applications or services; and
generating an instance of an environment based on the definition file and the one or more environment templates whereby the at least one task to be executed by the environment management system to create the one or more environments modifies the operating system or the one or more applications or services for the instance.

7. A non-transitory computer readable medium storing computer-executable code for managing environments associated with software projects, the non-transitory computer readable medium comprising:
code for generating information configured to provide a graphical user interface that enables a user of the graphical user interface to declaratively specify the lifecycle of one or more environments to be created by an environment management system for executing software code;
code for receiving input provided via the graphical interface indicative of at least one task to be executed by an environment management system to create the one or more environments, at least one task to be executed by the environment management system to manage the execution of software code in the one or more environments, and at least one task to be executed by the environment management system to destroy the one or more environment; and
code for generating a definition file indicative of the lifecycle of the one or more environments based on the input provided via the graphical interface that instructs the environment management system to deploy one or more environment templates as the one or more environments created by the environment management system for executing software code.

8. The non-transitory computer readable medium of claim 7 wherein the code for receiving the input provided via the graphical interface comprises code for receiving information defining one or more tasks to be performed at a predetermined stage of the lifecycle of the environment for a service within the one or more environments.

9. The non-transitory computer readable medium of claim 8 wherein the code for receiving the input provided via the graphical interface comprises code for receiving information indicative of an ordering associated with one or more tasks.

10. The non-transitory computer readable medium of claim 8 wherein the code for receiving the input provided via the graphical interface comprises code for receiving information indicative of a user that will execute a task.

11. The non-transitory computer readable medium of claim 8 wherein the environment definition comprises an Extensible Markup Language (XML) file.

12. The non-transitory computer readable medium of claim 8 further comprising:
code for receiving the one or more environment templates, each environment template including at least an operating system and one or more applications or services; and
code for generating an instance of an environment based on the definition file and the one or more environment templates whereby the at least one task to be executed by the environment management system to create the one or more environments modifies the operating system or the one or more applications or services for the instance.

13. A system for managing environments associated with software projects, the system comprising:
an interface that enables a user to declaratively specify the lifecycle of one or more environments to be created by an environment management system for executing software code;
a processor; and
a memory coupled to the processor, the memory configured to store a set of instructions which when executed by the processor cause the processor to:
receive input provided via the graphical interface indicative of at least one task to be executed by an environment management system to create the one or more environments, at least one task to be executed by the environment management system to manage the execution of software code in the one or more environments, and at least one task to be executed by the environment management system to destroy the one or more environment; and
generate a definition file indicative of the lifecycle of the one or more environments based on the input provided via the graphical interface that instructs the environment management system to deploy one or more environment templates as the one or more environments created by the environment management system for executing software code.

14. The system of claim 13 wherein the processor is caused to receive information defining one or more tasks to be performed at a predetermined stage of the lifecycle of the environment for a service within the one or more environments.

15. The system of claim 13 wherein the processor is caused to receive information indicative of an ordering associated with one or more tasks.

16. The system of claim 13 wherein the processor is caused to receive information indicative of a user that will execute a task.

17. The system of claim 13 wherein the environment definition comprises an Extensible Markup Language (XML) file.

18. The system of claim 13 wherein the processor is caused to:
receive the one or more environment templates, each environment template including at least an operating system and one or more applications or services; and
generate an instance of an environment based on the definition file and the one or more environment templates whereby the at least one task to be executed by the environment management system to create the one or more environments modifies the operating system or the one or more applications or services for the instance.

* * * * *

UNITED STATES PATENT AND TRADEMARK OFFICE
CERTIFICATE OF CORRECTION

| | | |
|---|---|---|
| PATENT NO. | : 8,286,131 B2 | Page 1 of 1 |
| APPLICATION NO. | : 12/053881 | |
| DATED | : October 9, 2012 | |
| INVENTOR(S) | : Das et al. | |

It is certified that error appears in the above-identified patent and that said Letters Patent is hereby corrected as shown below:

On Title page, in column 1, under "Inventors", line 6, delete "Andra" and insert -- Andhra --, therefor.

On Title page, in column 1, under "Inventors", line 7, delete "Andra" and insert -- Andhra --, therefor.

In column 2, line 48, delete "invention" and insert -- invention. --, therefor.

Signed and Sealed this
Eighth Day of January, 2013

David J. Kappos
*Director of the United States Patent and Trademark Office*